United States Patent [19]

Hashiguchi

[11] 4,248,091
[45] Feb. 3, 1981

[54] ULTRASONIC PULSE-ECHO APPARATUS
[75] Inventor: Mutsuo Hashiguchi, Tokyo, Japan
[73] Assignee: Tokyo Shibaura Denki Kabushiki Kaisha, Kawasaki, Japan
[21] Appl. No.: 43,808
[22] Filed: May 30, 1979
[30] Foreign Application Priority Data Jun. 30, 1978 [JP] Japan .................................. 53/79469
Aug. 14, 1978 [JP] Japan .................................. 53/98783
Aug. 28, 1978 [JP] Japan .................................. 53/103802

[51] Int. Cl.³ ............................................ G01N 29/00
[52] U.S. Cl. ........................................ 73/631; 73/900
[58] Field of Search ................. 73/625, 626, 627, 628, 73/631, 900, 606

[56] References Cited
U.S. PATENT DOCUMENTS

| 3,605,504 | 9/1971 | Kummer, Jr. et al. | 73/900 |
| 4,043,181 | 8/1977 | Nigam | 73/631 |
| 4,140,107 | 2/1979 | Lancée et al. | 73/900 |
| 4,205,555 | 6/1980 | Hashiguchi | 73/631 |

OTHER PUBLICATIONS

A. DeClercq et al., "Adaptive Gain Control for Dynamic Ultrasound Imaging", 1975 Ultrasonic Symposium Proceedings IEEE, pp. 59-63, 1975.

Primary Examiner—Stephen A. Kreitman
Attorney, Agent, or Firm—Oblon, Fisher, Spivak, McClelland & Maier

[57] ABSTRACT

For use in an ultrasonic pulse-echo apparatus including an ultrasonic wave transducer for transmitting an ultrasonic wave into an object to be examined and for producing a first image signal corresponding to echo pulses reflected from the interior of the object, an improved signal processing means for compensating for brightness varying effects caused by varying the object and for providing a second image signal corresponding to the first image signal, and an X-Y type display device for displaying the image of the object from the second image signal. Compensation for the brightness varying effect is secured by a gain controlled amplifier of which the gain is controlled by a control signal corresponding to the cumulative second image signal of the preceding frame.

13 Claims, 38 Drawing Figures

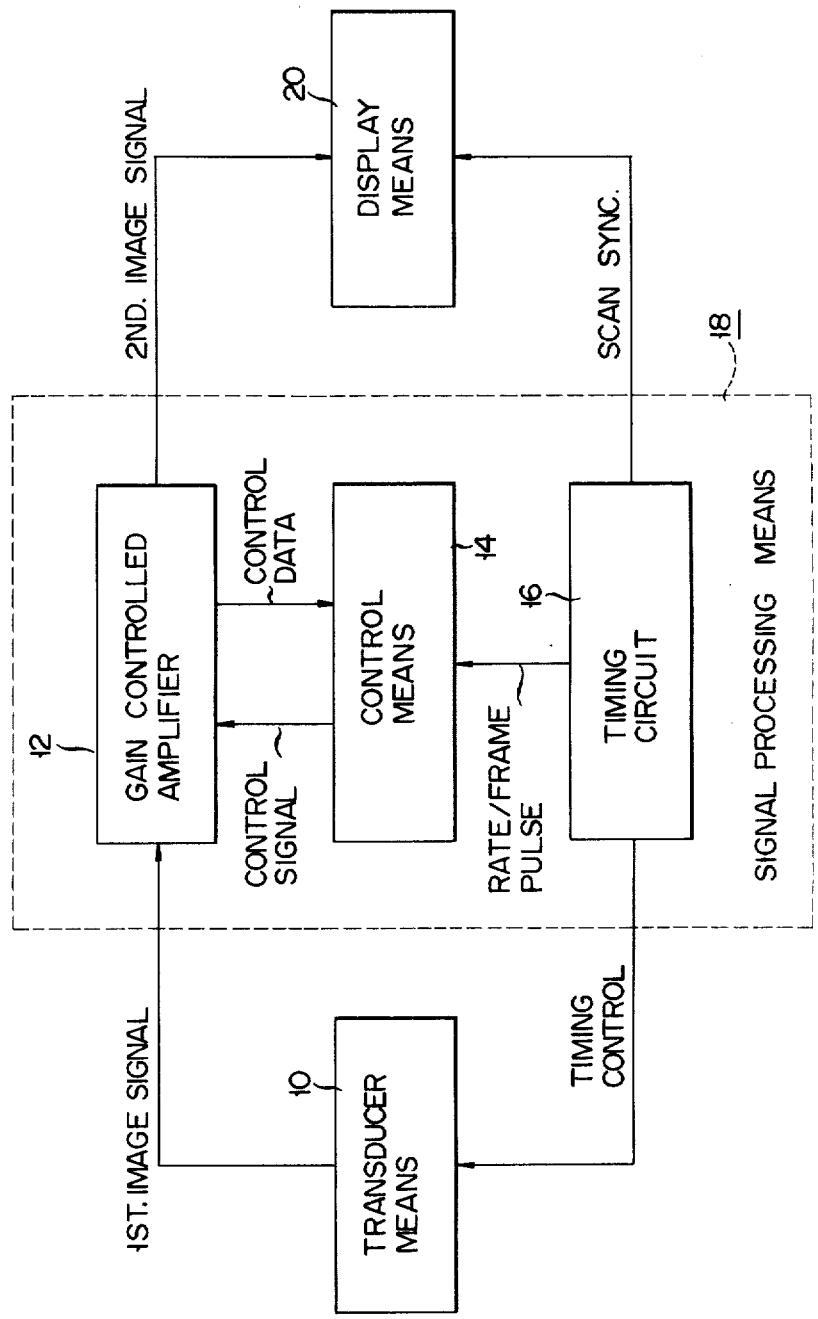
F I G. 1

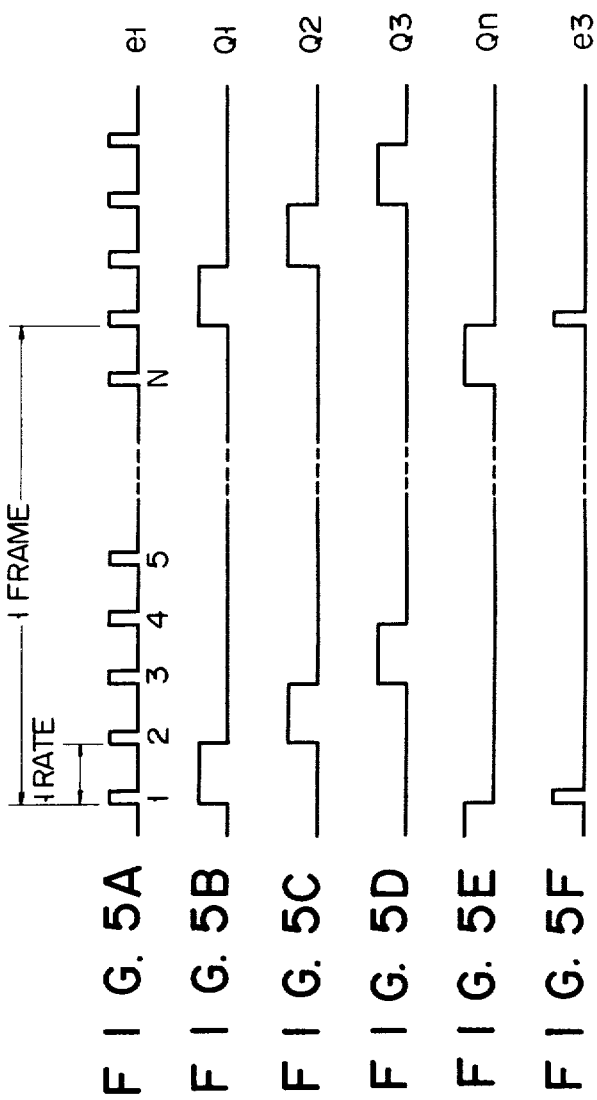

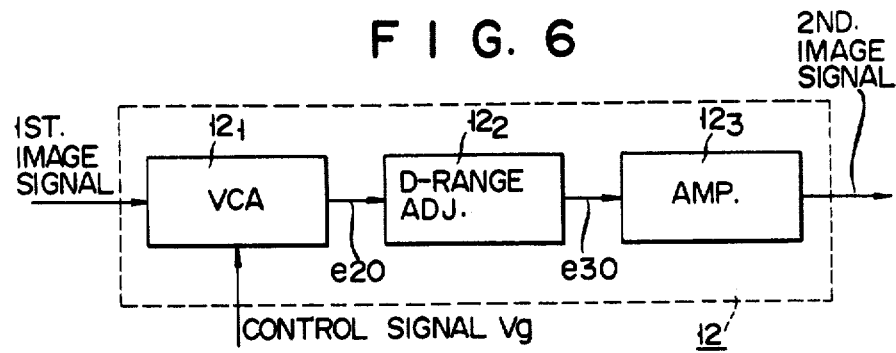
F I G. 6
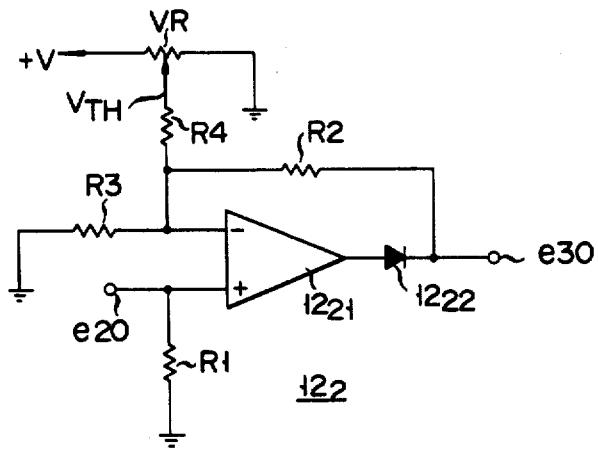
F I G. 7
F I G. 8A  $V_{TH}=0$
F I G. 8B  $V_{TH}>0$

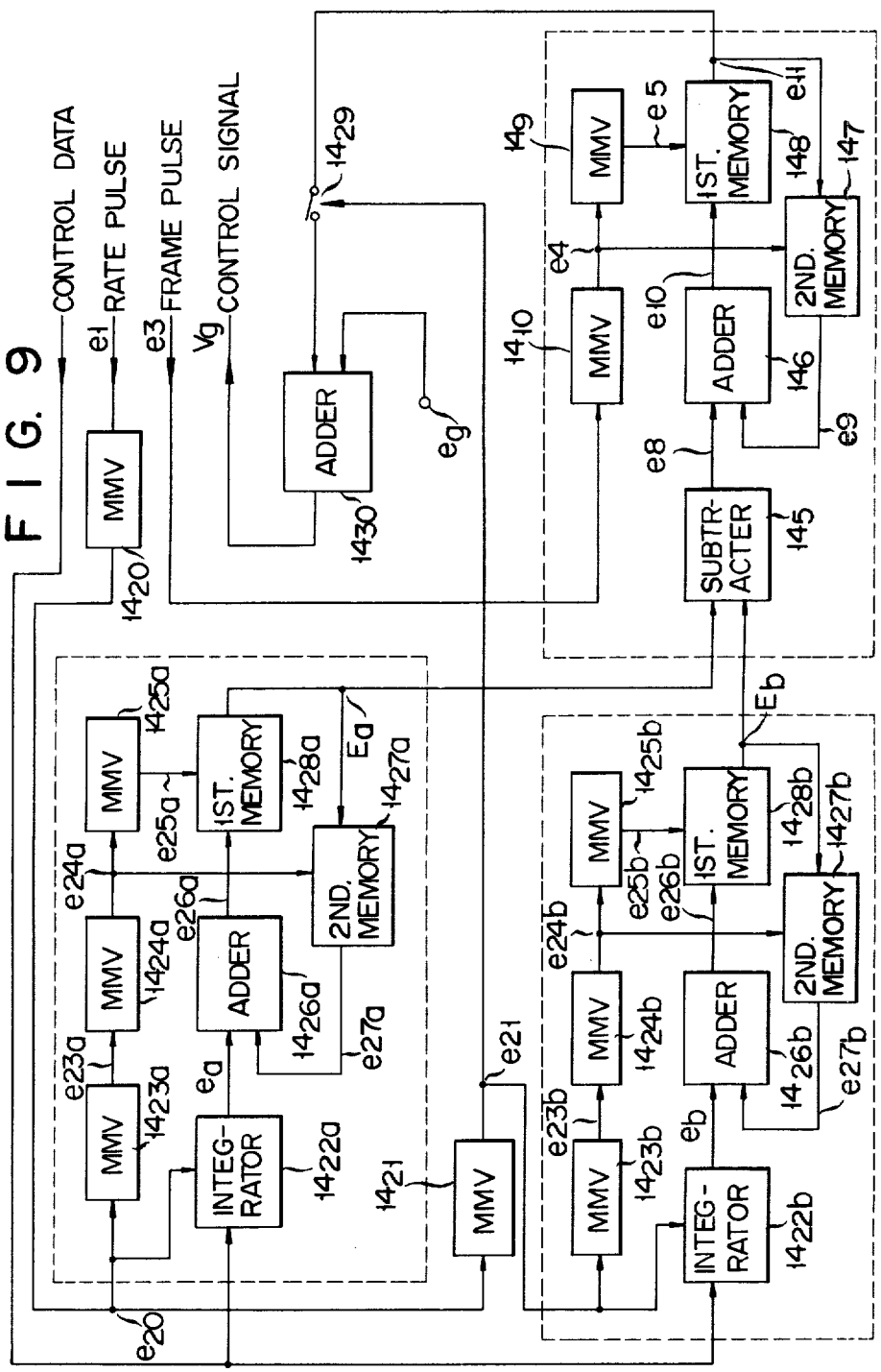

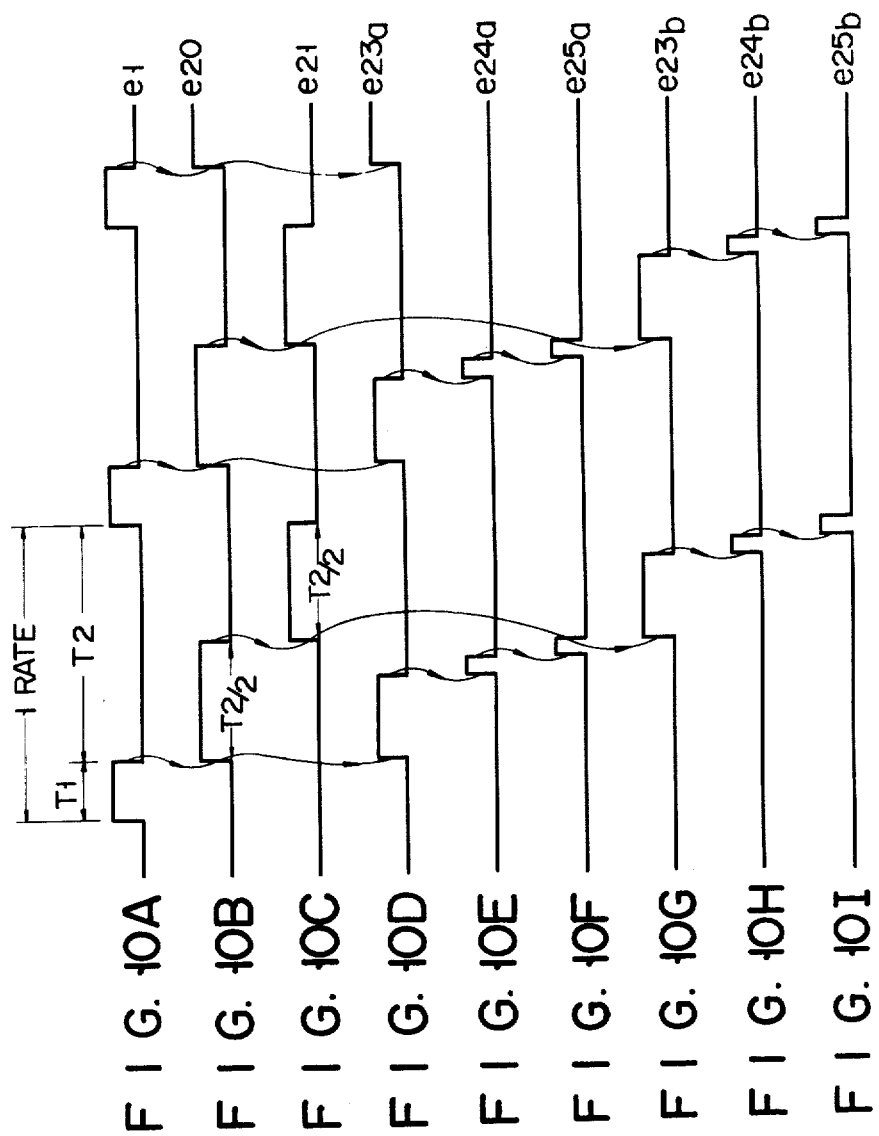

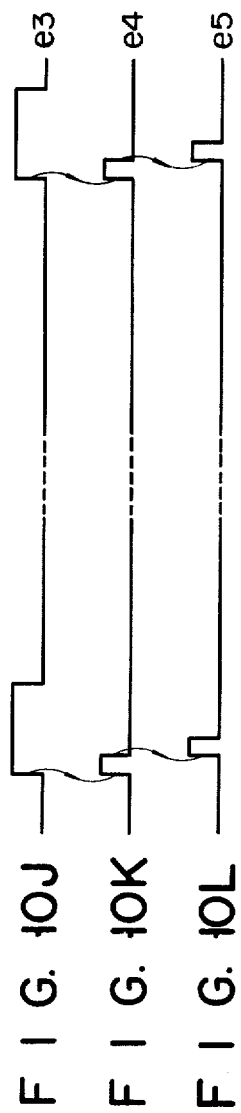
FIG. 10J
FIG. 10K
FIG. 10L
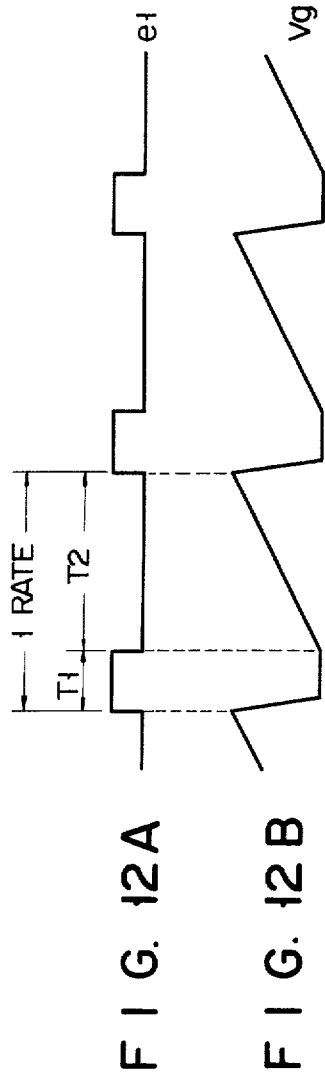
FIG. 12A
FIG. 12B

ULTRASONIC PULSE-ECHO APPARATUS

The present invention relates to an ultrasonic pulse-echo apparatus in which a cross-sectional image of the interior of an object formed by using ultrasonic waves may automatically be kept at a proper brightness, and is displayed at such a brightness.

In an ultrasonic diagnosis apparatus which is a typical example of the ultrasonic pulse-echo apparatus, ultrasonic pulses are projected into the interior of an organism and are reflected at objects inside the organism and the information relating to the shapes of organs within the organism and the tissues of the organs are visualized upon receipt of the return ultrasonic pulses from the interior of the organism. Generally, a cathode ray tube (CRT) is intensity-modulated by an electric signal formed depending on the return waves to display a cross-sectional image. The return waves from the organism interior depends largely on the location and the kind of the organism. Accordingly, as the location of the organism to be diagnosed or a patient changes, the brightness of the cross-sectional image of it changes. Therefore, in order to obtain a cross-sectional image always at a proper brightness irrespective of the kind of an object, it is necessary to keep at a proper magnitude the amplitude of a signal for performing the intensity modulation between the ultrasonic wave receiving part and a display unit. A method for keeping the intensity-modulation signal at a proper magnitude is roughly classified into a gain adjusting method by manual and a method by using an automatic gain controled (AGC) circuit. From an operation point of view, the latter AGC method is superior to the former manual gain adjusting method. An example of the ultrasonic pulse-echo apparatus by using the AGC circuit is disclosed in U.S. Pat. No. 4,043,181 (Anant K. Nigam). The Nigam patent uses cumulative energies of the reflected waves during one horizontal scanning period or one rate pulse period of a CRT display to control an intensity modulation signal during the succeeding horizontal scanning period to be constant in the amplitude. Accordingly, the brightness of a cross-sectional image thus controlled is substantially uniform over an entire screen of CRT, particularly horizontally across the screen. Incidentally, unless such a control is applied, the brightness of lower portion of the cross-sectional image is different from that of upper portion. This apparatus can make uniform the brightness of the cross-sectional image independently of a change of the object, that is to say, a difference of the location or the kind of the object. In this apparatus, however, the gain control is carried out in the same manner for each horizontal scanning period so that a cross-sectional image in the same picture (i.e. frame) has a uniform brightness over the entire picture. Accordingly, it is hard to shade the cross-sectional image. Weakening the action of the AGC circuit permits a slight shading of the image. In this case, however, the brightness of the cross-sectional image changes depending on the kind of the object. As described above, there has never been developed such an apparatus that an average brightness over the entire cross-sectional image is automatically controlled to be constant while the nature of an object tissue may be visualized with a shading of a cross-sectional image.

Accordingly, an object of the invention is to provide an ultrasonic pulse-echo apparatus which can display a cross-sectional image with an uniform brightness irrespective of the kind of an object and with a good reproducebility of a graduation in the image displayed.

To achieve the above object of the invention, there is provided an ultrasonic pulse-echo apparatus comprising: (a) transducer means which transmits an ultrasonic beam into a multilayered object to be examined and converts ultrasonic pulses reflected at interfaces between the layers within the object into a first image signal; (b) X-Y type display means which is intensity-modulated by a second image signal for displaying an image within the object; (c) signal processing means which amplifies the first image signal by a given amplification degree to produce the second image signal. The signal processing means further comprises: a timing circuit which transfers to the transducer means a timing control signal for determining transmitting and receiving timings of the ultrasonic pulses, transfers to the display means a scanning synchronizing signal to synchronize the scannings of X- and Y-axes with the transmitting/receiving timing of the ultrasonic pulses, and produces a first pulse with a period corresponding to the X-axis scanning of the display means and the timing of the ultrasonic pulse transmission, and a second pulse corresponding to the timing of the Y-axis scanning of the display means; a gain control amplifier which receives the first image signal and produces the second image signal; and control means which integrates control data corresponding to the second image signal to keep uniform an average brightness of an image displayed on the display means, accumulates the result of the integration at the timing corresponding to the second pulse and provides the accumulated result as a control signal for the succeeding frame or field to the gain controlled amplifier of which the given amplification degree is determined by the control signal.

The ultrasonic pulse-echo apparatus thus constructed causes the intensity-modulated signal of the cross-sectional signal to be displayed by the display means to be subjected to an automatic gain control under control of a control signal composed for each frame or a field. Accordingly, the brightness of the cross-sectional image in each frame is made uniform and the graduation of an image within the same frame is reproduced with a high fidelity.

A better understanding of the invention will be obtained from the following detailed description, in connection with the accompanying drawings, in which:

FIG. 1 shows a block diagram of a basic circuit construction of an ultrasonic pulse-echo apparatus according to the invention;

Figure 2:
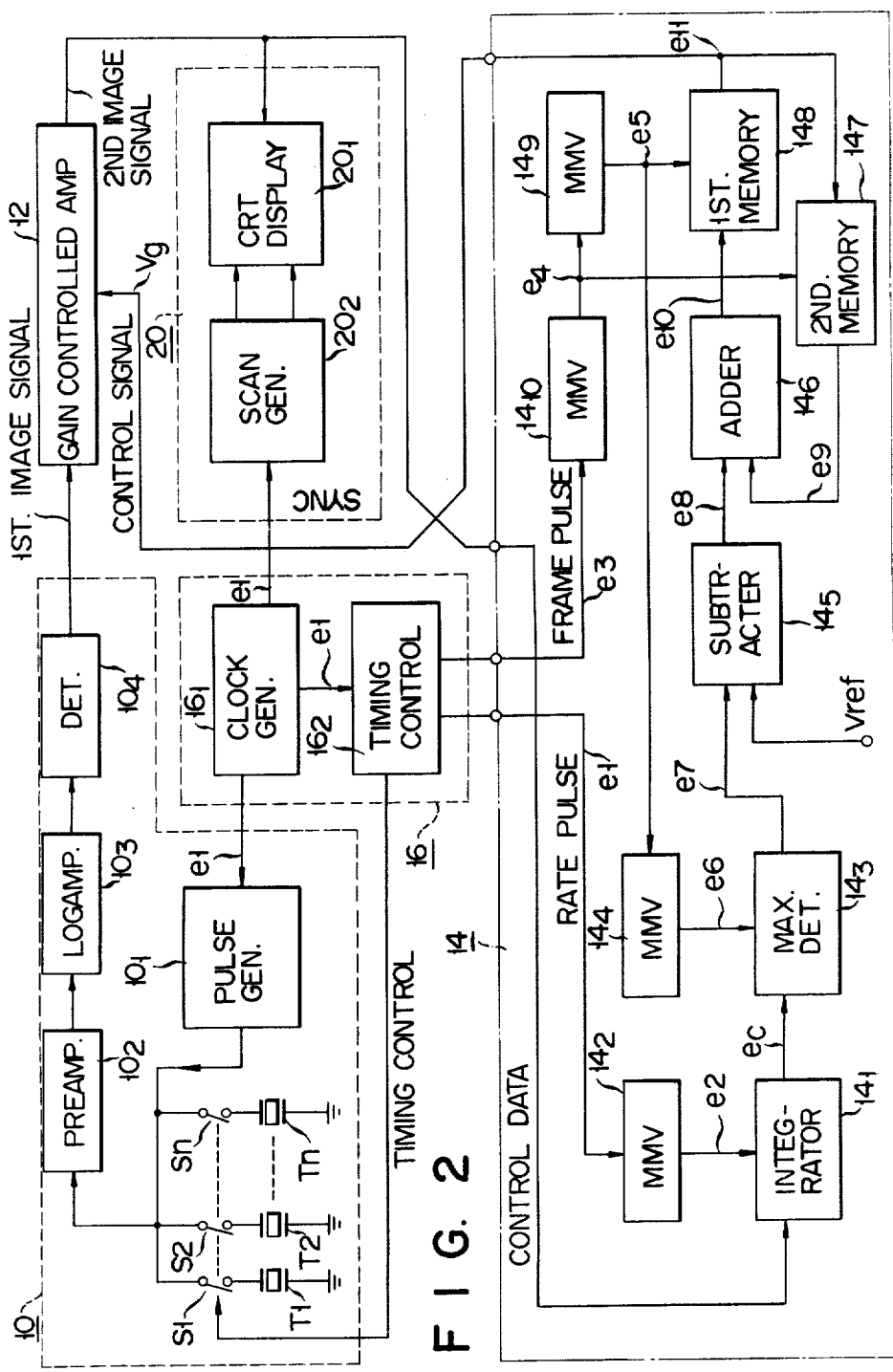
FIG. 2 shows a block diagram of a more detailed circuit construction of the apparatus shown in FIG. 1.
Figure 4:
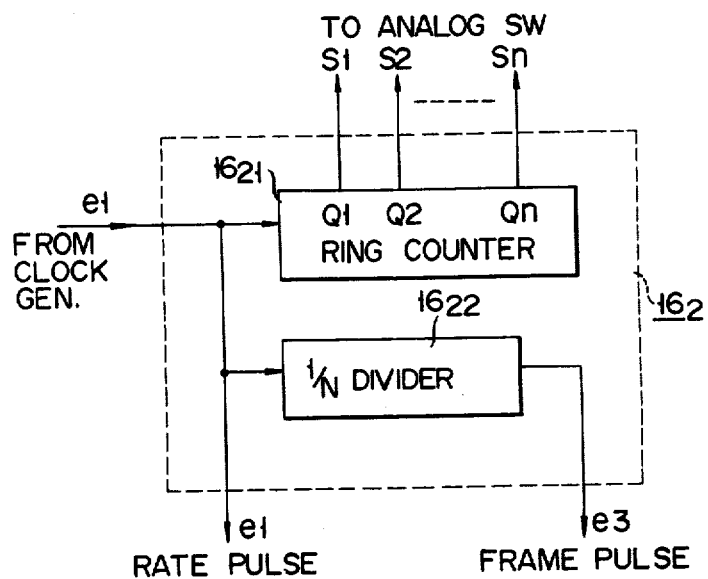
Figure 11:
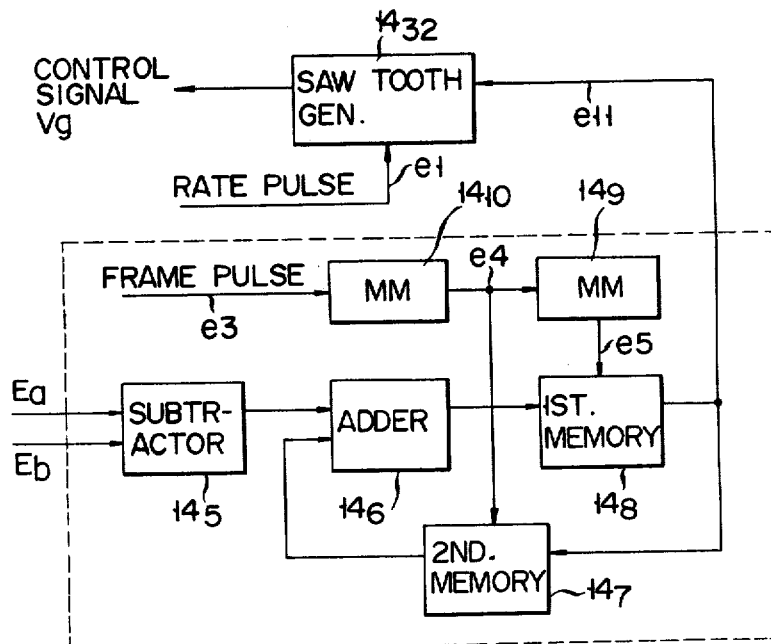
Figure 13:
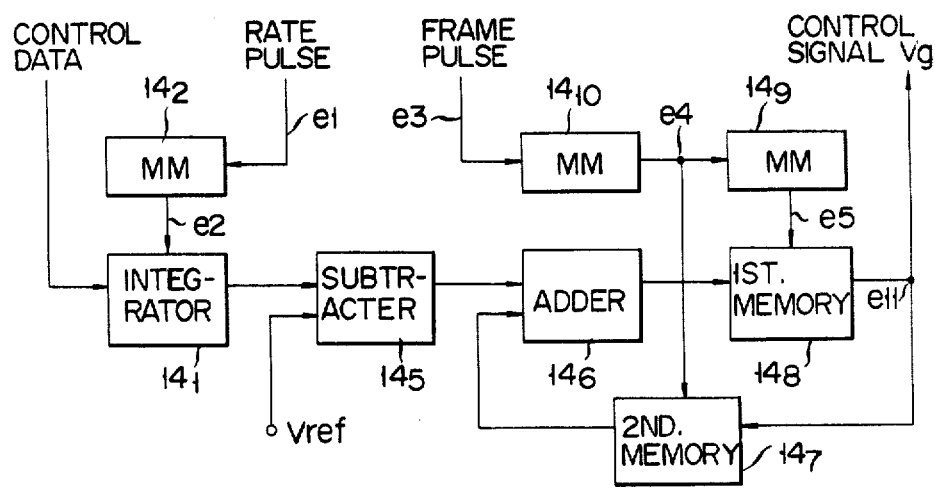
Figure 14:
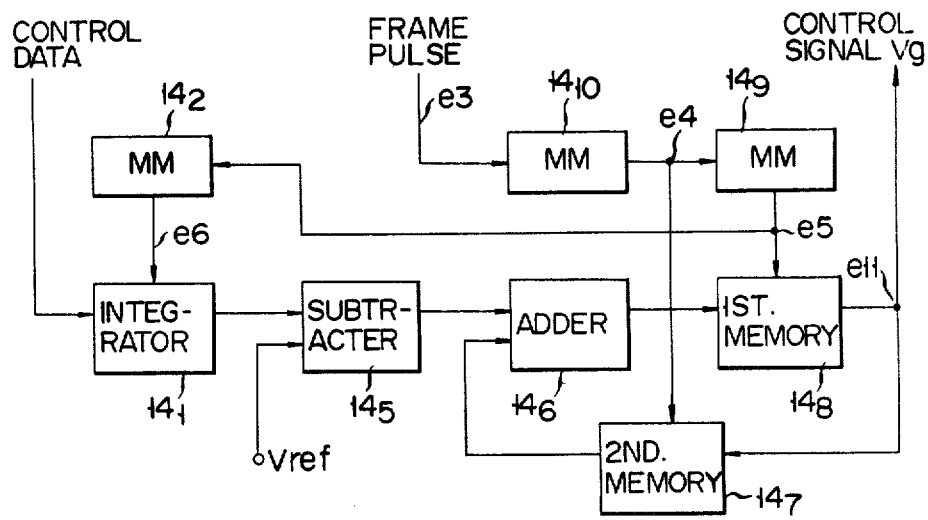

FIGS. 3A-G shows a timing chart useful in explaining the operation of the apparatus shown in FIG. 2;

FIG. 4 shows a block diagram of a timing control circuit shown in FIG. 2;

FIGS. 5A-F shows a timing chart useful in explaining the operation of the timing control circuit shown in FIG. 4;

FIG. 6 shows a block diagram of a gain controlled amplifier shown in FIG. 2;

FIG. 7 shows a circuit diagram of a dynamic range adjustment circuit shown in FIG. 6;

FIGS. 8A-B shows waveforms of a signal at the output of the circuit shown in FIG. 7 when a dynamic range is large ($V_{TH}=0$) and it is small ($V_{TH}>0$);

FIG. 9 shows a block diagram of a modification of a control means shown in FIG. 2;

FIGS. 10A-L shows a timing chart useful in explaining the operation of the circuit shown in FIG. 9;

FIG. 11 shows a block diagram of a circuit diagram used when the sensitivity time control in the circuit shown in FIG. 2 or 9 is carried out by the gain controlled amplifier;

FIGS. 12A-B shows a timing chart for illustrating the operation of a saw-tooth generator shown in FIG. 11;

FIG. 13 shows a block diagram of a modification of the control means shown in FIG. 2 where an integrated value of each rate, keeping its state, is subtractively summed with a control target value $V_{ref}$; and FIG. 14 shows a block diagram of another modification of the control means 14 shown in FIG. 2 in which an integrated value of each frame, keeping its stage, is subtractively summed with a control target value $V_{ref}$.

Throughout the drawings, like reference numerals will be used to designate like portions or the equivalent portions for simplicity of explanation.

Referring now to FIG. 1 illustrating a basic construction of an ultrasonic pulse-echo apparatus according to the invention, a transducer means 10 is provided an ultrasonic probe, an ultrasonic transmitter and an ultrasonic receiver. When driven by a pulse from the transmitter, the probe transmits an ultrasonic beam into a multilayered object to be examined. Ultrasonic echo pulses reflected at the interfaces between the layers within the object are received by the probe. The echo pulses received by the probe are converted into a first image signal in the receiver. The first image signals converted are applied to a gain controlled amplifier (GCA) 12. The gain of the GCA 12 is controlled by a control signal supplied from control means 14. A second signal produced from the GCA 12 serves as an intensity modulation signal with a substantially constant magnitude irrespective of a variation of an average level of each frame of the first image signal. The second image signal is applied to a display 20. The display 20 is provided with a display unit of CRT type like that of a TV set, for example. The display unit displays a cross-sectional image intensity-modulated by the second image signal, on the screen of a CRT.

The control means 14 composes the control signal on the basis of control data derived from the gain controlled amplifier means 12. The control data corresponds to the second image signal and, usually, the second image signal per se is used as the control data. The composing timing of the control signal in the control means 14 is determined by a rate/frame pulse fed from a timing circuit 16. In other words, the control signal is composed for each frame. This means that the control signal relating to a cross-sectional image of the frame is formed by an cumulative composed value of the first image signal relating to a cross-sectional image of the preceding frame. The composing of the control signal will be described in detailed examples to be given later. The timing circuit 16 also produces a timing control signal and a scan synchronizing signal. The timing control signal is used to determine the timing of the ultrasonic transmitting and receiving pulses in the transducer means 10. The scan synchronizing signal is used to synchronize horizontal and vertical scanning in the display means 20 with the timing of the transmitting and receiving waves of the ultrasonic pulses and the gain control in the GCA 12.

The GCA 12, the control means 14 and the timing circuit 16 constitute a signal processing means 18 which is essential to the invention. Note here that the gain control of the image signal in the means 18 is not performed during one horizontal scanning period or one rate pulse period, but is performed on one frame period or one field period basis. In the present invention, however, the gain control may be carried out by using the information of a plurality of preceding frames. Furthermore, in an alternate gain control allowable, a single frame is divided into N sections and an intensity modulation information in the ith frame portion and the i+1th frame portion are used for the gain control. A case of N=2 will be described as an example of such dividing one frame into a plurality of sections.

Figure 3:
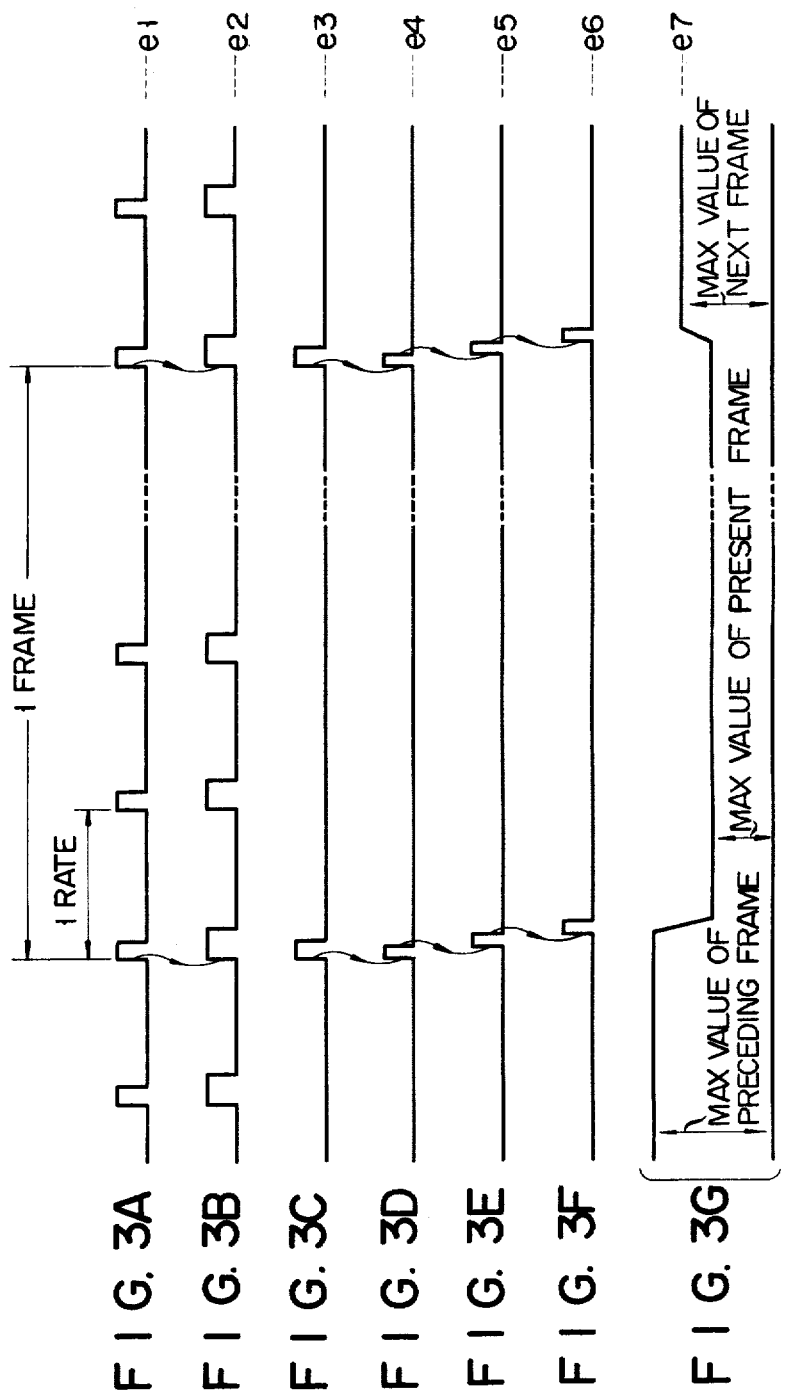

FIG. 2 shows in block form a detailed construction of the apparatus shown in FIG. 1. A clock generator 16 produces a rate pulse e1 as shown in FIG. 3A. The rate pulse e1 has a frequency of 4 KHz and 400 rate pulses correspond to one frame, for example. The rate pulse e1 is applied to a timing control circuit $16_2$. Upon the receipt of the rate pulse, the circuit $16_2$ produces the rate pulse e1, a frame pulse e3 which is formed by frequency dividing the rate pulse into 1/400 and timing control signals shifted one by one at the timing of the rate pulse.

The rate pulse e1 generated from the generator $16_1$ is applied to a pulse generator $10_1$. Upon the receipt of the rate pulse, the generator $10_1$ produces drive pulses with large amplitudes at the same timing as that of the rate pulse e1. The drive pulses are successively applied to ultrasonic vibrator elements, through switches S1 to Sn. By the timing control signals, the switches S1 to Sn are sequentially turned on and off alternately or every block consisting of a plurality of switches. In the former case, when the ultrasonic radiating face of the vibrator element used is narrow, the directivity of an ultrasonic beam radiated from the vibrator elements is wide. For this, the resolution of a cross-sectional image formed is poor. In the latter case, the ultrasonic radiating face may equivalently be large so that the directivity of the beam is acute. For example, when the vibrator elements are driven every eight vibrator elements, the switches are turn on and off by the timing control signals in the following manner. Assuming that at the timing of the first rate pulse, the switches S1 to S8 are turned on and S9 to Sn are turned off. At the timing of the second rate pulse, the switches S2 to S9 are turned on and the remaining switches are turned off. When the switches are controlled in such a manner, an acute beam of ultrasonic pulses are obtained and therefore the resolution of the image is high.

Ultrasonic pulses are transmitted from the vibrators T1 to T8 into the object and are reflected out from the interior of the object. The echo pulses from the object interior are received by the same vibrators T1 to T8. Those echo pulses received drive the vibrators T1 to T8 produce electrical signals which are composed through switches S1 to S8 and then the composed one is inputted to a preamplifier $10_2$. The electrical signal inputted into the preamplifier $10_2$ is supplied through a logarithmic amplifier $10_3$ to a detector $10_4$. Upon receipt of the electrical signal, the detector $10_4$ produces a first image signal corresponding to the electrical signal.

The ultrasonic absorption properties of an object media is generally expressed by following attenuation exponential function $$I = I_0 \exp(-\alpha Z) = I_0 \exp(-\alpha ct) \qquad (1)$$

where I designates an intensity of ultrasonic pulses, Z is a propagation path-length, $\alpha$ and c are an attenuation coefficient and a speed of ultrasonic wave, and t indicates an arrival time of return pulses to the vibrators. Io indicates an intensity of ultrasonic pulses when $t=0$. The electrical signal expressed by the equation (1) is converted into a decreasing linear function by the logarithmic amplifier $10_3$. Specifically, the equation (1) is converted into an equation (2).

$$\ln I = \ln Io \exp(-\alpha ct) = \ln Io - \alpha ct \quad (2)$$

As seen from the equation (2), if a circuit with a linear increase of gain with time for each rate pulse period is provided in the detector $10_4$ or the subsequent signal circuit, an image signal may be formed which is free from the influence of the ultrasonic absorption within the object. Such a gain compensation for the ultrasonic absorption is generally called a time-gain compensation (TGC) or a sensitivity time control (STC).

The first image signal outputted from the detector $10_4$ is inputted to a gain controlled amplifier (GCA) 12. The gain of the GCA 12 is determined by a control signal Vg composed by the cross-sectional image information of the preceding frame. The first image signal amplified (or attenuated) by the the GCA 12 is applied as a second image signal to a CRT device $20_1$. The device $20_1$ is subjected to an intensity modulation by the second image signal. Also supplied to the device $20_1$ are saw-tooth waves of 4 KHz and 10 KHz, for example, from a scan generator $20_2$ for horizontal (X axis) and vertical (Y axis) sweeping. These saw-tooth waves are synchronized with a rate pulse e1 applied from the clock generator $16_1$.

The second image signal is applied as control data to an integrator $14_1$. The timing control circuit $16_2$ supplies the rate pulse e1 as shown in FIG. 3A to a monostable multivibrator (MMV) $14_2$. Then, the MMV $14_2$ supplies to the integrator $14_1$ a reset pulse e2 which has the same period as that of the rate pulse e1 and a slightly wider pulse width than that of the pulse e1. The generator $14_1$ performs an integration operation when the reset pulse e2 is at a low level. The reason why the pulse width of the pulse e2 is selected to be longer than that of the pulse e1 is to prevent the initial pulse signal other than the echo pulses to be integrated when the ultrasonic pulses are received. The integrated value $e_c$ of the control data integrated by the integrator $14_1$ corresponds to a cumulative value of the second image signal displayed by the display device $20_1$ during the integration period or one rate period. The integrated value $e_c$ is applied to a maximum value detector $14_3$. When receiving a load pulse e6 from the MMV $14_4$, the detector $14_3$ stores the maximum value of the integrated value $e_c$. The maximum integrated value is held by the detector $14_3$ until the next load pulse e6 is applied to the detector.

The maximum integrated value held by the detector $14_3$ is applied as a maximum value signal e7 as shown in FIG. 3G to a subtractor $14_5$. The subtractor $14_5$ has been supplied with a reference DC voltage $V_{ref}$ serving as a control target in the AGC operation. The subtractor $14_5$ produces a difference signal e8 corresponding to a difference between the maximum value signal e7 and the reference voltage $V_{ref}$, $e7-V_{ref}$. The signal e8 is applied to an adder $14_6$. At this time, the adder $14_6$ has received the information (DC voltage) e9 of the preceding frame stored in a second memory $14_7$. A summation signal e10 corresponding to the sum $e8+e9$ of the preceding frame information and the difference signal, is applied to a first memory $14_8$. When the MMV $14_9$ applies a load pulse e5 to the first memory $14_8$, the signal e10 is loaded in the first memory $14_8$. The output signal e11 from the first memory $14_8$ is supplied as the control signal Vg to the GCA12, and to the second memory $14_7$. The second memory $14_7$ stored the output signal e11 when receiving a load pulse e4 from the MMV $14_{10}$.

A frame pulse e3 as shown in FIG. 3C is supplied from the timing control circuit $16_2$ to the MMV $14_{10}$. The MMV $14_{10}$ is triggered at the leading eadge of the frame pulse e3 and produces a load pulse e4 with a given pulse width. The MMV $14_9$ is triggered at the trailing edge of the load pulses e4, as shown in FIG. 3E, and produces a load pulse e5 with a given pulse width. The MMV $14_4$ is triggered at the trailing edge of the load pulse e5, as shown in FIG. 3F, to produce a load pulse e6 with a given pulse width. As seen from FIGS. 3C to 3F, the load pulses e4 to e6 are synchronized with the frame pulse e3 and are successively produced with a delay of one pulse. Accordingly, the contents of the first memory $14_8$ is first stored in the second memory $14_7$. Then, the sum of the contents stored in the second memory $14_7$ and the output of the subtractor $14_5$, or a difference signal e8 updates the contents of the first memory $14_8$. Following this, the maximum detector $14_3$ produces a maximum value signal e7 to change the magnitude of the difference signal e8. By the control signal Vg depending on the present frame information composed in such a process, the gain of the GCA12 for the cross-sectional image of the next frame is determined. The gain of the GCA 12 is so controlled that a DC level of the maximum value signal e7 approaches to the reference DC voltage $V_{ref}$, that is to say, the absolute value of the difference $e7-V_{ref}$ becomes the minimum value. An average brightness of the cross-sectional image displayed by the display device $20_1$ may manually be adjusted by the reference voltage $V_{ref}$.

FIG. 4 shows a detailed circuit construction of the timing control circuit $16_2$. When the ultrasonic vibrators T1 to Tn are operated one by one in successive manner, a timing chart of the operation of the circuit $16_2$ is shown in FIGS. 5A to 5F. A ring counter $16_{21}$ of n bit is clocked by a clock pulse as shown in FIG. 5A or a rate pulse e1. As a result, the counter $16_{21}$ produces at the output terminals Q1, Q2 . . . Qn drive pulses, as shown in FIGS. 5B to 5E, which are shifted at the timing of the rate pulse e1. Those drive pulses subsequently turn on the analog switches S1 to Sn. The frame pulse e3 is formed by frequency-dividing the rate pulse e1 into 1/N by means of a frequency divider $16_{22}$. FIG. 5F shows frame pulses e3 when the number n of the analog switches and the frequency dividing ratio N are related by $n=N$. As a matter of course, a relation $n \neq N$ is allowable in this example. When the display device $20_1$ is such that one frame is formed by two fields, if the period of the frame pulse e3 is selected to be ½, it permits the AGC operation for each field.

FIG. 6 shows a detailed circuit construction of the gain controlled amplifier 12. The first image signal is applied to a voltage controlled attentuater or amplifier (VCA) $12_1$. An attenuation degree or amplification degree of the VCA $12_1$ is changeable depending on a DC level of the control signal Vg. As a result of the change of such a factor, a transfer function of the VCA $12_1$ is set up at a large value when the integrated value of the second image signal of the preceding frame is small, while the former is set up at a small value when the latter is large. The first image signal or signal e20 of which the amplitude controlled by the VCA $12_1$ is applied to a dynamic range adjustment circuit $12_2$. The circuit $12_2$ is a linear amplifier which responds to only a signal e20 with a given amplitude or more. In other words, the circuit $12_2$ is an amplifier permitting only an analog signal with a larger level than a given threshold level $V_{TH}$. The signal e30 of which the components less than the threshold level $V_{TH}$ is cut off, is amplified by the circuit $12_3$ to be the second image signal.

FIG. 7 shows a detailed circuit diagram of the dynamic range adjustment circuit $12_2$. The signal e20 is applied to a non-inverted input terminal of an operational amplifier $12_{21}$. This input terminal is grounded through a resistor R1. The output terminal of the amplifier $12_{21}$ is connected to its inverted input terminal via an anode-cathod path of a diode $12_{22}$ and a resistor R2. The inverted input terminal is grounded by way of a resistor R3 and connected to a slider of a variable resistor VR by way of a resistor R4. The resistor VR is grounded at one end and accepts at the other end a DC voltage +V. The signal e30 is derived from a cathode of the diode $12_{22}$.

The given threshold level voltage $V_{TH}$ is applied to the inverted input terminal of the amplifier $12_{21}$ through the resistor R4. The voltage $V_{TH}$ may be properly changed by adjusting the resistor VR. When $V_{TH}=0$, the circuit $12_2$ serves as a linear amplifier responsive to all the positive levels. The signal e30 at this time takes a waveform including small level echo pulses, as shown in FIG. 8A. When $V_{TH}>0$, the components smaller than the $V_{TH}$ in the signal e20 are cut off so that only high level echo pulses, as shown in FIG. 8B, are outputted as the signal e30. That is, when $V_{TH}=0$, the dynamic range is at maximum, and thus the details of the cross-sectional image is displayed. The reference voltage $V_{ref}$ may be adjusted in a manner that, when $V_{TH}=0$, a proper image is obtainable. When $V_{TH}>0$, as the $V_{TH}$ becomes larger, the dynamic range inversely becomes smaller, with the result that the details of the cross-sectional image is not displayed. Therefore, when one desires to observe roughly the interior of the object, the dynamic range is set to be small while, when one desires to observe the details of the interior of the body, the dynamic range is selected to be large. In the present invention, since the AGC operation is carried out for each frame, a reproducibility of graduation is good when the dynamic range is large. It is hard to obtain this merit when the AGC operation is carried out for each rate.

FIG. 9 shows a modification of the control means 14 shown in FIG. 2. This circuit composes a signal to effect the AGC operation every 178 frame. Applied to the MMV $14_{20}$ is a rate pulse e1 with a period T1+T2, as shown in FIG. 10A. Here, the period T2 corresponds to one horizontal scanning period (1H) of the display device $20_1$ and the period T1 to a flyback period of one horizontal line. The period T1 also corresponds to a blanking period for an initial pulse at the time that ultrasonic pulses are received. The ultrasonic echo pulses are received at the period T2. The MMV $14_{20}$ is triggered at the trailing edge of the rate pulse e1 thereby to produce a first gate pulse e20 with a pulse width (½)T2, as shown in FIG. 10B. The pulse e20 is inputted into the MMV $14_{21}$. Then, the MMV $14_{21}$ is triggered at the trailing edge of the pulse e20 to produce a second gate pulse e21 with a pulse width (½) T2, as shown in FIG. 10C.

The first gate pulse e20 is applied to a first integrator $14_{22a}$ and an MMV $14_{23a}$. The MMV $14_{23a}$ is triggered at the leading edge of the pulse e20 to produce a delay pulse e23a with a narrower pulse width than that of the pulse e20. The pulse e23a is applied to the MMV $14_{24a}$. The MMV $14_{24a}$ is triggered at the trailing edge of the pulse e23a to produce a load pulse e24a, as shown in FIG. 10E. The pulse e24a is applied to the MMV $14_{25a}$. The MMV $14_{25a}$ is triggered at the trailing edge of the pulse e24a to produce a load pulse e25a, as shown in FIG. 10F. Applied to the integrator $14_{22a}$ is controlled data from the GCA12. The integrator $14_{22a}$ integrates the control data when the first gate pulse e20 is at a high level. The result of the integration $e_a$ corresponds to a cumulative value of the second image signal during a 178 rate period of the first half frame and is applied to an adder $14_{26a}$. On the other hand, when the load pulse $e24_a$ is applied to the second memory $14_{27a}$, the contents of the first memory $14_{28a}$ is stored into the memory $14_{27a}$. The contents $e27_a$ is added to the integration result $e_a$ by the adder $14_{26a}$. When the load pulse $e25_a$ is applied to the first memory $14_{28a}$, the addition result $e26_a$ from the adder $14_{26a}$ is loaded into the first memory $14_{28a}$. The data Ea stored in the first memory $14_{28a}$ includes the information which is a cumulative integration value with time of the echo pulses having occured thus far in the first half-frame.

The second gate pulse e21 is applied to a second integrator $14_{22b}$ and the integrator $14_{22b}$ provides an integration result $e_b$. The circuit components $14_{22b}$ and $14_{28b}$ are constructed in exactly the same manner as that of the components $14_{22a}$ to $14_{28a}$. Therefore, the data Eb stored in the first memory $14_{28b}$ includes the information which is cumulated time-integration values of the echo pulses having occurred up to that time in the latter half of frame.

The data Ea and Eb are inputted into a subtractor $14_5$. The circuit components $14_5$ to $14_{10}$ are constructed in exactly the same manner as that of those with like reference numerals shown in FIG. 2. An output signal e11 derived from the first memory $14_8$ includes the information corresponding to a difference Ea−Eb between the cumulative information Ea relating to the frame first half and the cumulative information Eb relating to the frame latter half. Assume now that one frame is formed by n rates and the frame first half integration results for each rate in a frame are designated by $e_{a1}, e_{a2}, \ldots e_{an}$, and the frame latter half integration results are designated by $e_{b1}, e_{b2} \ldots e_{bn}$. On this assumption, the contents of the first memories $14_{28a}$ and $14_{28b}$ in the first rate are $e_{a1}$ and $e_{b1}$, respectively. In the second rate, those are $(e_{a1}+e_{a2})$ and $(e_{b1}+e_{b2})$, respectively. Similarly, in the nth rate, those are $$\sum_{i=1}^{n} e_{ai} \text{ and } \sum_{i=1}^{n} e_{bi},$$

respectively. As described, the contents of the memories $14_{28a}$ and $14_{28b}$ are equal to data Ea and Eb, respectively. Accordingly, the difference Ea−Eb are equal to $$\sum_{i=1}^{n} e_{ai} - \sum_{i=1}^{n} e_{bi}.$$

The signal e11 is applied to an adder $14_{30}$, through an analog switch $14_{29}$. The adder $14_{30}$ is further supplied with a gain setting signal $e_g$ to provide a control target of the AGC. The result of the addition from the adder $14_{30}$ is applied as the control signal Vg to the GCA 12. The switch $14_{29}$ is turned on by the second gate pulse e21 occuring in the frame latter half. Accordingly, the control signal Vg in the frame first half is the signal $e_g$ per se. On the other hand, the control signal Vg in the latter half of frame becomes $e_g + e11$. In the construction shown in FIG. 2, the AGC control is performed in such a manner that the difference $|e7 - V_{ref}|$ in the subtractor $14_5$ is minimized. Similarly, the circuit construction in FIG. 9 controls in such a way that the difference $|Ea - Eb|$ is minimized. When this difference is minimized, the signal e11 also is minimized. Specifically, in the AGC operation, the brightness of a crosssectional image in the present frame is determined by the difference $|Ea - Eb|$ between the brightness of cross sectional image in the first half of the preceding frame which is determined by the signal $e_g$ and the brightness of cross sectional image in the later half of the preceding frame. The brightness of the cross sectional image, which is automatic-controlled through the AGC operation, is changeable by adjusting the gain setting signal $e_g$.

In the construction shown in FIG. 9, the screen or frame of the CRT display device $20_1$ is divided into two sections in a horizontal scanning derection and the AGC is applied in order that the average brightness of the screen 2-divided depends on the signal $e_g$. Alternately, the screen may be divided into N sections (N>2) as an application of the FIG. 9 construction. In more particular, the AGC control for the next frame is carried out so that the brightness of the ith cross sectional image in the N-divided screen and the brightness of the (i+1)th cross sectional image are equal to each other. In this case, the AGC operation also is carried out for each frame. The circuit construction in this case is the same as that in FIG. 9, except that the pulse widths of the respective pulses shown FIGS. 10B to 10I and the generation timings of them are different. If such a frame N-division AGC is used, the AGC in the next frame may be performed on the basis of the brightness at a specific portion in the cross sectional image. Also in this case, the AGC operation is performed for each frame so that the graduation of the picture is excellent.

Turning now to the FIG. 11, there is shown a circuit construction when the STC (TGC) in the FIG. 2 or 9 apparatus is carried out by the GCA 12. As mentioned referring to the equations (1) and (2), the STC or TGC are realized for one rate period by means of a circuit permitting an amplification degree to change linearly with time. In FIG. 11, when the rate pulse e1 is at a low level, the STC is performed by using as the control signal Vg a saw-tooth wave signal which is formed by integrating the signal e11 with time. The signal e11 taken out of the first memory $14_8$ is applied to a sawtooth generator $14_{32}$. As shown in FIGS. 12A and 12B, the generator $14_{32}$ integrates the signal e11 for the pulse interval T2 of the rate pulse e1 thereby to provide a control signal Vg which is a linear function with respect to time. When the GCA 12 is controlled by the sawtooth signal Vg, the brightness change of a cross sectional image due to a change of the object is prevented while at the same time the STC is performed. The sawtooth generator $14_{32}$ may be formed by using a Miller integrator or a saw-tooth wave generation circuit of bootstrap type. Those saw-tooth wave generating circuits are frequently found in the field of trigger sweep type oscilloscope.

FIGS. 13 and 14 show modifications of the control means 14 shown in FIG. 2. The FIG. 13 example performs the AGC operation for the next frame so as to minimize a difference an integration value of an integrator $14_1$ made every rate and the reference voltage $V_{ref}$. FIG. 14 example performs the AGC operation for the next frame so as to minimize a difference between an integration value of the integrator $14_1$ made every frame and the reference voltage $V_{ref}$.

In FIGS. 2, 9, 13 and 14, the control data is once integrated. Accordingly, the AGC operation is not affected by unexpected high peak signals included within echo pulses.

Although specific circuit constructions have been illustrated and described herein, it is not intended that the invention be limited to the elements and constructions disclosed. One skilled in the art will recognize that the particular elements or sub-constructions may be used without departing from the scope and spirit of this invention.

What is claimed is:

1. An ultrasonic pulse-echo apparatus comprising:
   (a) transducer means which transmits an ultrasonic beam into a multilayered object to be examined and converts ultrasonic pulses reflected at interfaces between the layers within the object into a first image signal;
   (b) X-Y type display means which is intensity-modulated by a second image signal for displaying an image within the object;
   (c) a signal processing means which amplifies the first image signal by a given amplification degree to produce the second image signal which comprises: a timing circuit which transfers to said transducer means a timing control signal for determining transmitting and receiving timings of the ultrasonic pulses, transfers to the display means a scanning synchronizing signal to synchronize the scannings of X- and Y-axes with the transmitting/receiving timing of the ultrasonic pulses, and produces a first pulse with a period corresponding to the X-axis scanning of the display means and the timing of the ultrasonic pulse transmission, and a second pulse corresponding to the timing of the Y-axis scanning of the display means; a gain controlled amplifier which receives the first image signal and produces the second image signal, and a control means which integrates control data corresponding to the second image signal to keep uniform an average brightness of an image displayed on the display means, accumulates the result of the integration at the timing corresponding to the second pulse and provides the accumulated result as a control signal for the succeeding frame or field to said gain controlled amplifier of which the given amplification degree is determined by the control signal.

2. An ultrasonic pulse-echo apparatus according to claim 1, wherein the control signal fed by said control means includes information which is the cumulated integration result for the preceding frame or field and the information of the preceding frame or field controls the brightness of the next frame or field.

3. An ultrasonic pulse-echo apparatus according to claim 1, wherein the control signal fed by said control means include information which is the cumulated integration result for the plural preceding frames or fields and the formation of the plural preceding frames or fields and the information of the plural preceding frames or fields controls the brightness of the next frame or field.

4. An ultrasonic pulse-echo apparatus according to claim 1, wherein, in order to obtain the integration result with respect to an area which is formed by dividing the same frame or the same field into N section in a X-axis scanning direction, said control means accumulates at the second timing corresponding to a second pulse a difference between first data which is an accumulation of the ith integration result at the timing of a first gate pulse synchronized with the first pulse and the second data which is an accomulate of the (i+1)th integration result at the timing of the second gate pulse subsequently occurring after the first gate pulse, and the cumulative result is used as the control signal, where $0 \leq i+1 \leq N$, $i = 1, 2, 3 \ldots$ 5. An ultrasonic pulse-echo apparatus according to claim 1, 2 or 3, wherein the integration timing of said control data in said control means is carried out at the timing of the first pulse.

6. An ultrasonic pulse-echo apparatus according to claim 1, 2 or 3, wherein the integration of said control data in said control means is carried out at the timing of the second pulse.

7. An ultrasonic pulse-echo apparatus according to claim 1, 2, 3 or 4, wherein, in said control means, an average value of the integration result of said control data is accumulated in order to obtain said cumulative result.

8. An ultrasonic pulse-echo apparatus according to claim 1, 2, 3 or 4 wherein, in said control means, a maximum value of the integration result of said control data is accumulated in order to obtain said cumulative result.

9. An ultrasonic pulse-echo apparatus according to claim 1, 2, 3 or 4, wherein said gain controlled amplifier comprises: a voltage controlled amplifier of which the transfer function is changed in accordance with a DC level of said control signal; and a dynamic range adjustment circuit connected in series to said voltage controlled amplifier to change a graduation of an image displayed by said display means, said dynamic range adjustment circuit being responsive to only an analog signal input with a larger level than a given threshold level.

10. An ultrasonic pulse-echo apparatus according to claim 1, 2, 3 or 4, wherein said transducer means includes a logarithmic amplifier for converting an attenuation of the ultrasonic echo pulse with respect to time into a linear function; and wherein said control means includes a saw-tooth generator which integrates said cumulative result for each period of the first pulse to provide the integration result as said control signal, in order to execute a sensitivity time control for said first image signal which is damped in a linear function manner.

11. An ultrasonic pulse-echo apparatus according to claim 7, wherein said control means comprises: an integrator for integrating said control data at the timing of the first pulse; a subtractor for providing a difference signal between the integration result of the integrator and a reference voltage serving as a control target for defining the brightness of an image displayed by said display means; an adder for providing a sum signal of the difference signal and the preceding frame or field information having been accumulated up to that time with respect to the preceding frame or field; a first memory into which the sum signal is loaded by a first load pulse in synchronism with the second pulse and the contents stored provides said cumulative result; and a second memory into which the contents of said first memory immediately before its contents is updated by the first load pulse is loaded by a second load pulse produced prior to the first load pulse, and the contents stored provides said preceding frame or field information.

12. An ultrasonic pulse-echo apparatus according to claim 8, wherein said control means comprises: an integrator for integrating said control data at the timing of the first pulse; a subtractor for providing a difference signal between the integration result of the integrator and a reference voltage serving as a control target for defining the brightness of an image displayed by said display means; an adder for providing a sum signal of the difference signal and the preceding frame or field information having been accumulated up to that time with respect to the preceding frame or field; a first memory into which the sum signal is loaded by a first load pulse in synchronism with the second pulse and the contents stored provides said cumulative result; and a second memory into which the contents of said first memory immediately before its contents is updatated by the first load pulse is loaded by a second load pulse produced prior to the first load pulse, and the contents stored provides said preceding frame or field information; and a maximum value detector which detects the maximum value signal from said integration results of said integrator and supplies the maximum value signal to said subtractor, said detector effecting said detecting operation for each frame or field at the timing of a third load pulse following the first load pulse.

13. An ultrasonic pulse-echo apparatus according to claim 4, wherein said control means comprising:

first means for composing said first data which includes a first integrator for integrating said control data at the timing of the first gate pulse: a second adder for adding the first integration result from said first integrator to a first preceding information accumulated up to that time with respect to the ith frame or field, thereby to provide a first addition result: a third memory to which the first addition result is loaded in response to a fourth load pulse subsequently occurring after the first gate pulse, the contents stored providing the first data: a fourth memory to which the contents of said third memory just before its content is updated by the fourth load pulse is loaded by a fifth load pulse occurring preceding to the fourth load pulse, the contents stored providing the first preceding information;

second means for composing said second data which includes a second integrator for integrating the control data at the timing of the second gate pulse: a third adder for adding a second integration result from said second integrator to the preceding information accumulated up to that time with respect to the i+1th frame or field, thereby to provide a second addition result; a fifth memory to which the second addition result is loaded by a sixth load pulse occurring following the second gate pulse, the contents stored providing the second data: and a sixth memory to which the contents of said fifth memory before its content is updated by the sixth load pulse is loaded by the 7th load pulse occurring preceding to the sixth load pulse, the contents stored providing the second preceding information;

third means for composing said control signal which includes a subtractor for providing a difference signal between said first data and the second data; an adder for providing a sum signal of the difference signal and preceding frame or frame information accumulated up to that time with respect to the preceding frame or field; a first memory to which the sum signal is stored by the first load pulse in synchronism with the second pulse, the contents stored providing the cumulative result; and a second memory to which the contents of said first memory just before its contents is updated by the 10th pulse is loaded by the second load pulse occurring preceding to the first load pulse, the contents of stored providing the preceding frame or field information.

* * * * *